(12) United States Patent
Gard et al.

(10) Patent No.: US 7,663,373 B1
(45) Date of Patent: Feb. 16, 2010

(54) DETERMINING BEACON LOCATION USING MAGNETIC FIELD RATIOS

(75) Inventors: Michael F. Gard, Perry, OK (US); Kody D. Mason, Stillwater, OK (US); Floyd R. Gunsaulis, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 220 days.

(21) Appl. No.: 11/958,167

(22) Filed: Dec. 17, 2007

Related U.S. Application Data

(60) Provisional application No. 60/870,275, filed on Dec. 15, 2006, provisional application No. 60/871,606, filed on Dec. 22, 2006.

(51) Int. Cl.
*G01V 3/18* (2006.01)
*G01V 3/08* (2006.01)
*G01V 3/26* (2006.01)

(52) U.S. Cl. ............... 324/346; 324/338; 175/40; 175/45; 702/141; 702/158; 340/853.1; 340/853.8; 340/854.1

(58) Field of Classification Search ......... 324/228, 324/232, 239, 243, 326, 329, 332–334, 345–346; 175/40, 45; 702/141, 158; 340/853.1, 853.8, 340/854.1
See application file for complete search history.

(56) References Cited

U.S. PATENT DOCUMENTS 5,878,825 A * 3/1999 Okuyama et al. ............ 175/61
6,693,429 B2 * 2/2004 Mercer ...................... 324/326

* cited by examiner

*Primary Examiner*—Bot L LeDynh
(74) *Attorney, Agent, or Firm*—Tomlinson & O'Connell, PC

(57) ABSTRACT

A method and system for identifying a location of a magnetic field source. A total magnetic field is measured during a calibration routine prior to a drilling procedure. During the drilling procedure, a magnetic field measurement is obtained. Using a ratio of the measured magnetic field and the calibrated field, a set of possible angles and distances is calculated. After the source is advanced a known distance, a second magnetic field measurement is obtained. A second ratio is calculated and a second set of possible angles and distances is calculated. The relative location of the source is then determined using the first set and second set of values, along with the known distance and a pitch angle of the source.

18 Claims, 4 Drawing Sheets

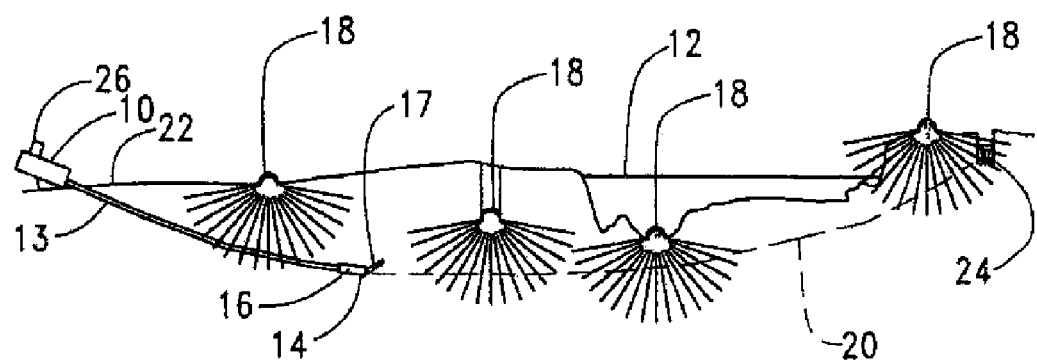
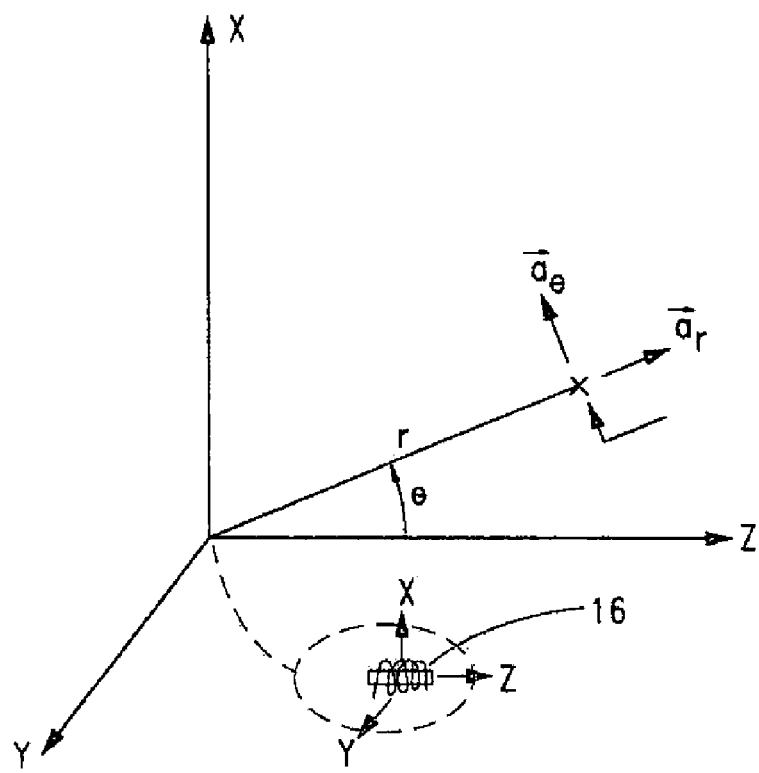
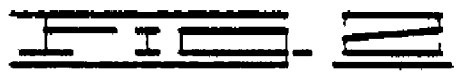

DETERMINING BEACON LOCATION USING MAGNETIC FIELD RATIOS

CROSS REFERENCE TO RELATED APPLICATION

This application claims the benefit of provisional patent application Ser. No. 60/870,275 filed on Dec. 15, 2006, and provisional patent application Ser. No. 60/871,606 filed on Dec. 22, 2006, and the entire contents of each are incorporated herein by reference.

FIELD OF THE INVENTION

The present invention relates generally to the field of locating underground objects, and in particular to locating and tracking a beacon or transmitter within the field of operation of a horizontal drilling machine.

SUMMARY OF THE INVENTION

The present invention is directed to a method for determining the location of a below ground source of a magnetic field. The method comprises the steps of obtaining a calibration measurement of a magnetic field from the source, detecting a first measurement of the magnetic field from the source when the source is at a first location below ground, calculating a ratio of the first magnetic field measurement to the calibration measurement, identifying a set of solution angles and distances to the source, advancing the source a known distance to a second location, detecting a second measurement of the magnetic field from the source when the source is at the second location, determining a pitch of the source using a measurement device, calculating a ratio of the second magnetic field measurement to the calibration measurement, identifying a second set of solution angles and distances to the source, and determining a location of the source using the first set and second set, the known distance, and the pitch.

In another aspect the present invention is directed to a method for determining a location of a below ground source of a magnetic field. The method comprises the steps of determining a ratio between a total magnetic field measured at a location of the source below ground and a total magnetic field measured during calibration, advancing the source a known distance to a second location, determining a ratio between a total magnetic field measured at the second location and the total magnetic field measured during calibration, measuring a pitch of the source, and determining a position of the source relative to a position on the surface of the ground using the determined ratios, the known distance, and the measured pitch.

In still another aspect the invention is directed to a method for tracking progress of a horizontal bore. The method comprises the steps of deploying a plurality of detection devices spaced along the ground with each detection device being adapted to detect a magnetic field from the source, moving the source to a location along an underground path, detecting a magnetic field from the source using a first one of the detection devices, moving the source to a second location along the underground path, detecting the magnetic field from the source at the second location using the first one of the detection devices and a second one of the detection devices, determining a relative location of the source to each detection device using a corresponding magnetic field ratio, a distance the source traveled, and a pitch of the source, moving the source to a third location along the underground path, detecting the magnetic field from the source at the third location using the second one of the detection devices, and determining a second relative location of the source to each detection device using a corresponding magnetic field ratio, a distance the source traveled, and a pitch of the source.

BRIEF DESCRIPTION OF THE DRAWINGS

FIG. 1 is an illustration of a horizontal directional drilling system for drilling a horizontal borehole and a tracking system built in accordance with the present invention.

FIG. 2 is a graphical representation of the geometry for use with the present invention.

BACKGROUND OF THE INVENTION

Figure 3:
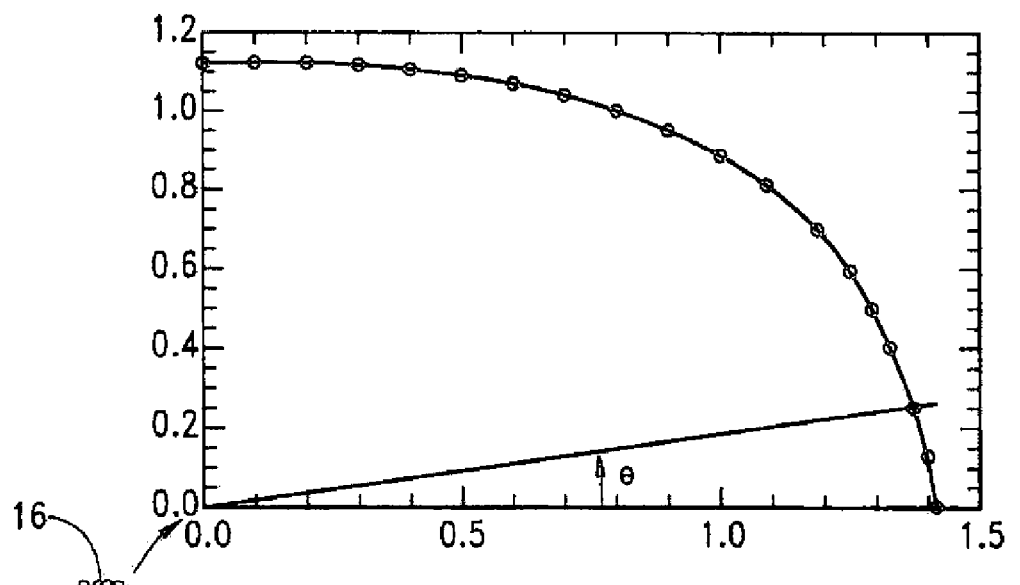
FIG. 3 is a polar plot of a kernel representative of the present invention.

The horizontal directional drilling (HDD) industry traditionally uses walk-over tracking techniques to follow the progress of a bore or utility installation, to find the surface location immediately above a drill bit or backreamer, and to determine the depth of the drill bit or backreamer from that surface location. The primary tracking tools are a subsurface transmitter and a hand-carried surface receiver. The transmitter, located in or very near a boring tool or backreamer, generally emits a magnetic dipole field created by a single coil dipole antenna. The transmitted dipole field can be used to find the surface location over the transmitter, to determine the depth of the transmitter, and to receive data transmitted by the subsurface transmitter when the emitted magnetic field is suitably modulated to convey data.

While walkover tracking is the directional drilling industry's primary tracking technique, the HDD industry is acutely aware of significant limitations of walk-over technology. Walkover tracking requires a minimum crew of two (one machine operator and one tracker operator), and walkover tracking is sometimes impractical, impossible, or dangerous (as when drilling under river beds or canals, when drilling under buildings or other structures, or when drilling under major highways or other thoroughfares with multiple lanes of heavy traffic). In addition, there is a long-felt need for improved drilling accuracy as the bit nears the desired exit point (sometimes called a "bore to the box" operation). Improved navigational information is always an industry need.

DESCRIPTION OF THE INVENTION

With reference now to the drawings and to FIG. 1 in particular, there is shown therein a representation of a planned HDD operation using an HDD boring machine 10 for crossing beneath an obstacle 12, shown as a river. FIG. 1 illustrates use of a drill string 13 with a drill head 14 to drill a borehole. The drill head 14 comprises a transmitting beacon 16 and a drill bit 17. The present invention is for a system and method that resolves the physical position of an underground (transmitting) beacon 16 relative to one or more (receiving) "detection devices" 18 which are placed at various stationary positions above, below, or inline with the planned drill path 20.

The detection devices 18 may be positioned on a (ground) surface 22, or above or below it. This surface may also be underwater, as shown in FIG. 1.

The application of the present invention may also utilize a second method for resolving physical position within regions along the intended bore path 20 which are between the working areas of one or more detection devices 18. An alternative embodiment comprises a drill head 14 having magnetometers, accelerometers, gyroscopes, or other electronic devices to provide an orientation of the drill bit 17. If the beacon's 16 pitch (as measured by an accelerometer or other device) and magnetic bearing (as provided by a compass or other device) are known, the drill bit 17 may be guided by a dead reckoning procedure when out of range of the detection devices 18. As the drill head 14 and drill bit 17 are advanced in areas out of range of the detection devices 18, its approximate position may be determined by addition of the vectors representing each advancement of the drill bit.

The combination of resolving position via a dead reckoning procedure and via detection devices 18 allows a very reasonable alternative to walkover locating. Although dead reckoning procedures are prone to accumulating errors over long distances, the use of multiple detection devices 18 to shorten the intervals where dead reckoning is required allows for frequent correction of any dead reckoning errors.

The present invention provides a method whereby a non-walkover system may be used with the HDD machine 10 and results in very precise placement of the drill bit 17 in relation to a target point 24, even at long distances. Significantly, a simple yet highly effective algorithm tracks drill head 14 progress with no more information than (1) the ratio between total magnetic field at an arbitrary location and the total magnetic field during calibration, (2) the incremental drill bit advance between two such magnetic field amplitude ratio measurements, and (3) drill bit pitch angle. The present application discusses the physics underlying the technique, which provides a workable solution to a very difficult problem which is mathematically underspecified—that is, there are more unknowns than measurements. This invention also provides an accurate positional solution with underspecified data.

In the preferred embodiment, the detection device 18, or receiver, for use with the present invention contains an antenna assembly, a processor, and a transmitter. The antenna assembly preferably comprises a three-axis antenna operably connected to a three-channel data acquisition apparatus providing substantially uniform amplification, filtering, and digitization of the antenna signals. The antennas may be either ferrite-cored or air-cored antenna triads, although an air-cored antenna triad is the preferred embodiment. The preferred embodiment is an antenna triad sharing or acting at a common center, which provides a complete three-axis measurement at substantially a single location. An acceptable antenna arrangement for use with the present invention is discussed in commonly owned U.S. patent application Ser. No. 11/863,903, the contents of which is incorporated herein in its entirety. Other signal detection or antenna technologies are available and are anticipated to fit within the scope of this invention.

The processor of the detection device 18 is preferably adapted to receive electrical signals from the antenna assembly and process the signals. The processor is adapted to use the electrical signals received from the antenna assembly to identify magnetic field measurements and may process the signals to determine information encoded or otherwise transmitted on the signals. The measurements and information obtained by the processor may then be communicated by the transmitter. The information from the transmitter may be communicated via a radio link (or other know communication technique) to a remote system such as a control system 26 at the HDD machine 10.

Preferably, the information transmitted from the detection device 18 is received at the control system 26 of the HDD machine 10, though other remote systems in communication with the detection device 18 are contemplated. More preferably, the control system 26 comprises a processor adapted to use information provided by the HDD machine 10 and received from the detection device 18 to determine the relative location of the source as described herein. The location of the source 16 may then be used by the processor for continued operation of the boring machine 10. Alternatively, the processor may be operably connected to a display for communicating the location of the source 16 to an operator for use during the boring operation.

Preferably, the beacon 16, or signal source, behaves as a magnetic dipole. Equations describing the magnetic field produced by a dipole source are commonly known. For purposes of the present invention, equations used to characterize the magnetic field are done using spherical coordinates, although the basic geometry of interest to the HDD machine 10 operator usually is given in a Cartesian coordinate system. Spherical coordinate symmetry considerations allow the results to remain general under the assumption y=0, so that the result is actually derived for the x-z plane. With reference to FIG. 2, shown therein is a geometrical representation for the present invention with the vertical (depth) dimension considered to be the x-axis and the horizontal dimension the z-axis.

Derivation of Eq. (1), shown below, is available elsewhere, and the derivation is not repeated here. The derivation assumes a single-turn circular loop antenna (the beacon 16) with radius a carrying current I. The circular loop is assumed to be located in the x-y plane with its center at the origin. The source's magnetic field at an arbitrary point in the x-z plane is given by the following expression (in spherical coordinates):

$$\vec{H}_{total} = \left(\frac{I(\pi a^2)\sin\theta}{4\pi r^3}\right)\vec{a}_\theta + \left(\frac{I(\pi a^2)\cos\theta}{2\pi r^3}\right)\vec{a}_r, \quad (1)$$

where I is the loop current, the quantity $\pi a^2$ is the loop area, r is the radial distance from the source 16 to the measurement point, and $\theta$ is the direction angle from the loop axis (the z-axis) to the observation point (the detection device 18).

The vector amplitude is the quadrature sum of the individual components. In the case of Eq. (1) above, it may be shown that $$|H_{total}| = \frac{I\pi a^2}{4\pi r^3}\sqrt{\sin^2\theta + 4\cos^2\theta}. \quad (2)$$

Although the quantity under the square root is not complicated, it is convenient to simplify the expression even further to permit an uncomplicated solution for the direction angle $\theta$. This is accomplished using well-known trigonometric double angle relationships, which yield the intermediate result $$|H_{total}| = \frac{I(\pi a^2)}{4\pi r^3}\sqrt{\frac{1}{2}(5 + 3\cos 2\theta)}. \quad (3)$$

This disclosure deals with scalar values representing total field amplitudes. For simplicity in notation, let it be understood that the symbol $H_{total}$—the total magnetic field amplitude—will be used without braces. Now square both sides of Eq. (3) and rearrange terms to obtain the result $$(H_{total})^2 \left(\frac{4\pi r^3}{I\pi a^2}\right)^2 = \frac{1}{2}(5 + 3\cos 2\theta). \tag{4}$$

Though Eq. (4) leads directly to a solution for direction angle $\theta$, each individual receiver 18 must be calibrated to the particular dipole source 16. The results in Eqs. (1)-(4) represent source 16 signal amplitude by the term $I\pi a^2$. In practical situations, the loop current and the effective loop area [a concept involving the number of transmitter antenna winding turns, antenna ferrite permeability (if a ferrite-cored antenna is used), and other antenna details] are not known accurately and are difficult to control precisely in production equipment. Instead, the tracking receiver 18 normally is calibrated to a particular transmitting antenna 16 while in a known orientation at a known distance from the transmitter antenna. Conventional tracking receivers are often calibrated at a measured distance of 10 feet along a radial line in the x-y plane from the center of the transmitter antenna. This corresponds to $\theta=90°=\pi/2$ radians in the present spherical geometry. A calibration distance of 10 feet will be used for purposes of illustration.

The results which follow depend on the values of the angle $\theta$ at calibration, which will be determined by the exact details of the calibration procedure. It would be possible to calibrate directly along the major axis of the beacon 16 ($\theta=0$), which would produce a different numerical result for $H_{cal}$ than those obtained below. This difference would ripple through all subsequent mathematical developments. The calibration procedure used herein reflects common industry practice for existing commercial tracking receivers 18, but the calibration procedure used herein is by no means the only calibration procedure that could be used. Use of any other angle than $\theta=\pi/2$ will require subsequent adjustment of various constants in the following derivations, although such an alternative derivation will parallel the procedure used in the material which follows. Different calibration procedures do not represent a departure from the developments of this invention For example, it is possible to calibrate at a distance of 10 ft. parallel to the major axis of the beacon 16. This corresponds to a distance of 10 ft with $\theta=\pi/2$. In this case, $$H_{cal}^2 \left[\frac{4\pi (10\,\text{ft})^3}{I\pi a^2}\right]^2 = \frac{1}{2}(5 + 3\cos\pi) = 1,$$

which leads to:

$$\left(\frac{I\pi a^2}{4\pi}\right)^2 = H_{cal}^2 (10\,\text{ft})^6. \tag{5}$$

Eq. (5) makes it possible to express magnetic field intensity at any point in the x-z plane in terms of the calibration magnetic field amplitude. This is done by substituting the relationship of Eq. (5) into Eq. (4):

$$\frac{H_{total}^2(r)^6}{H_{cal}^2(10\,\text{ft})^6} = \frac{1}{2}(5 + 3\cos 2\theta). \tag{6}$$

It is now convenient to introduce the quantity $H_{ratio}$, the ratio of the total magnetic field at any point to the total magnetic field during calibration:

$$H_{ratio} = \frac{H_{total}}{H_{cal}}. \tag{7}$$

The parameter defined in Eq. (7) is especially useful, since $H_{ratio}$ is a measured quantity readily provided by the tracking receiver. The relationship in Eq. (7) allows Eq. (6) to be rewritten as $$2(H_{ratio}^2)\left(\frac{r}{10\,\text{ft}}\right)^6 = 5 + 3\cos 2\theta. \tag{8}$$

In general, of greater significance is a form of Eq. (8) which produces a direct solution for r, namely $$2^{1/6}(H_{ratio}^{1/3})\left(\frac{r}{10\,\text{ft}}\right) = (5 + 3\cos 2\theta)^{1/6}. \tag{8a}$$

Before proceeding to obtain a direct solution for the direction angle $\theta$, consider the significance of Eq. (8a). The term $(5+3\cos 2\theta)^{1/6}$ is a kernel, a significant entity for the present invention. The kernel may be treated as a mathematical description of a characteristic shape, profile, or contour. The general relationship between radial distance, r, and direction angle, $\theta$, can be interpreted as the kernel scaled by the quantity $H_{ratio}$ and the calibration distance. Preferably, the calibration distance is 10 feet, and calibration is accomplished as is customary in the industry.

Finally, obtain a direct solution for the direction angle, $\theta$, using (8):

$$\theta = \frac{1}{2}\cos^{-1}\left\{\frac{1}{3}\left[2(H_{ratio}^2)\left(\frac{r}{10\,\text{ft}}\right)^6 - 5\right]\right\}, \tag{9}$$

and a direct solution for the radial distance, r, also using Eq. (8) or Eq. (8a):

$$r = (10\,\text{ft})\left[\frac{5 + 3\cos 2\theta}{2(H_{ratio})^2}\right]^{1/6}. \tag{10}$$

In practical field situations, both radial distance r and direction angle $\theta$ are unknown—the only available measured quantity is the scalar reading $H_{ratio}$. Thus, the problem is underspecified—there are more unknowns than readings. However, given a scalar reading $H_{ratio}$, Eq. (9) immediately establishes upper and lower bounds on the only permissible values of r. Because Eq. (9) contains an arccosine function, the argument of the arccosine must satisfy the relationship $-1 \leq \text{argument} \leq 1$. It may be shown that the only permissible range for radial distance r, is given by $$\frac{10 \text{ ft}}{(H_{ratio})^{1/3}} \leq r \leq (2)^{1/3} \left[ \frac{10 \text{ ft}}{(H_{ratio})^{1/3}} \right]. \quad (11)$$

The relationship in Eq. (11) will be revisited after discussing the kernel $(5+3 \cos 2\theta)^{1/6}$.

As noted during the discussion of Eq. (8a), the kernel $(5+3 \cos 2\theta)^{1/6}$ has particular significance. It may be considered a basic distance-angle relationship which is scaled according to the measured value $H_{ratio}$. Referring now to FIG. 3, shown therein is a first quadrant polar plot of the kernel $(5+3 \cos 2\theta)^{1/6}$. Observe that the radial distance is not uniform as direction angle $\theta$ is varied from 0° to 90° in 5° increments. The maximum value of the kernel, 1.41421, is obtained at $\theta=0°$ while the minimum value of the kernel, 1.12246 is obtained at $\theta=90°$. Note that $(1.12246)(2)^{1/3}=1.41421$, as required by Eq. (11). Closer consideration will reveal the kernel is monotonic, without discontinuities, and very well-behaved.

The purposes of the software application as described herein is to process data from one or more (receiving) detection devices 18 within range of the beacon's 16 magnetic field and to calculate the position of the (transmitting) beacon relative to the detection device. At least one detection device 18 is required, although a plurality of devices may be used. Subsequent display of the beacon 16 position to an HDD operator follows in either graphical or numerical form, or both. The position displayed or reported may be relative to either the beacon or the detection device 18, or it may be referenced to another coordinate system.

Based on the "shape" of the total magnetic field being transmitted by the beacon 16, the software assumes the following mathematical relationship exists between the position of the beacon and detection device 18:

Let $H_{cal}$ represent the total magnetic field measured at a given calibration distance, $D_{cal}$, between the beacon 16 and a detection device 18 such that $\theta=\pi/2$ radians in the geometry of FIG. 2;

Let $H_{ratio}$ represent the ratio of any measured total field to $H_{cal}$; such that $H_{ratio}=H_{tot}/H_{cal}$;

Let $\theta$ represent a possible angle between the beacon 16 and the detection device 18, $0° \leq \theta \leq 90°$;

Let r represent a possible radial distance between the beacon 16 and the detection device 18; and Then given an $H_{ratio}$, and a set of possible $\theta$, a set of corresponding r possibilities can be calculated:

$$r/D_{cal}=((5+3 \cos 2\theta)/2(H_{ratio})^2)^{1/6} \quad (12)$$

The present invention uses the above relationship to resolve the relative position as follows:

With the beacon 16 at some unknown horizontal distance of separation ($Z_1$) inclined at a measured pitch angle ($P_1$) with respect to horizontal, a total magnetic field measurement is taken by a detection device 18 and a ratio ($H_{ratio1}$) is computed using the previously obtained calibration value $H_{cal}$. Next, the beacon 16 (via the drill string 13) is advanced a known incremental distance ($Z_A$), and at the new (and still unknown) position ($Z_2$) with the beacon 16 inclined at measured pitch angle ($P_2$), another total magnetic field measurement is taken by the detection device and its ratio ($H_{ratio2}$) is computed.

Eq. (11) establishes a range of possible values for the radial distance r for any measured magnetic field ratio $H_{ratio}$. Using Eq. (12), and iterating through possible angles of $\theta$, the two measurements $H_{ratio1}$ and $H_{ratio2}$ can be used to form sets of possible solutions. These sets of possible solutions in polar coordinates are denoted as $[(r_1,\theta_1)]$ and $[(r_2,\theta_2)]$. These sets contain possible solutions—the desired solutions from these sets are those which simultaneously satisfy the measured magnetic field ratios $H_{ratio1}$ and $H_{ratio2}$, known measurements of incremental drill string advance ($Z_A$) and measured beacon pitch ($P_1$ and $P_2$). It is generally sufficient, although not necessary, to use the average of the two pitch measurements.

The previously discussed kernel describes the shapes or contours on which the acceptable solutions must lie for any measured magnetic field ratio. The closed-form kernel expressions previously given are concisely expressed in polar coordinates, and the sets of possible solutions discussed above can be processed in polar coordinates if desired. However, the ultimate solution is expressed in Cartesian (rectangular) coordinates, and it is convenient to make the required conversion as a part of the solution testing procedure. Accordingly, the possible solution sets $[(r_1,\theta_1)]$ and $[(r_2,\theta_2)]$ may be replaced by equivalent possible solution sets $[(z_1,x_1)]$ and $[(Z_2,x_2)]$ using well-known standard coordinate transform relationships.

Evaluation in Cartesian coordinates is conveniently done by approximating the polar coordinate kernel, which is an exact relationship, by an $n^{th}$-order polynomial approximation in the Cartesian coordinate system, as follows:

$$f_1(z)=A_1z^n+B_1z^{n-1}+\ldots+K_1$$

$$f_2(z)=A_2z^n+B_2z^{n-1}+\ldots+K_2$$

As noted, the polar coordinate kernel is monotonic, without discontinuities, and very well-behaved. Thus, the Cartesian polynomial kernel approximation—while it may be of any desired order—introduces little error if the order of the approximation is made relatively low for the sake of computational efficiency. The use of any polynomial order $n \geq 1$ is within the scope of this invention. The preferred embodiment uses a second-order polynomial (n=2).

Resolving the position of the beacon 16 with respect to the detection devices 18 may be done by locating the point of symmetry between $f_1(z)$ and $f_2(z)$ such that the derivatives of $f_1(z)$ and $f_2(z)$ are equal; that is, $$\frac{\partial}{\partial z} f_1(z) = \frac{\partial}{\partial z} f_2(z).$$

The point of symmetry reveals the initial horizontal separation ($z_i$) on the z-axis and depth ($x_i$) of the beacon 16 on the x-axis. Subsequent advancement of the beacon 16 (via the drill string 13) at regular or irregular intervals ($Z_A$) corresponding to horizontal separations ($z_s$), along with the associated measured pitches ($P_s$) and total magnetic field ratios ($H_{ratio\ s}$), allows for subsequent revisions of the depth calculation using a corresponding polynomial equation ($f_s(z_s)$).

Detection devices 18 capable of measuring the left/right angle (on the y-axis) would allow the software to display that dimension as well. The preceding developments yield an approximation to the true three-dimensional solution when the lateral offset (along the y-axis) is small. If the bore path 20 generally approximates a line directly to the detection device 18, the solution is accurate.

In a scenario where multiple detection devices 18 are spaced out along the planned drill path 20, it is envisioned that as the beacon 16 passes under a detection device and slowly moves away from it, another detection device would immediately be, or would soon come, within range as the beacon approaches so the HDD operator's display could be updated continuously as drilling proceeds (in either a two-dimensional or a three-dimensional perspective). However, this invention is not dependent upon any specific proximity of the detection devices 18 to one another nor upon knowing any relationships (distances or changes in elevation) between any of the detection devices.

Figure 4:
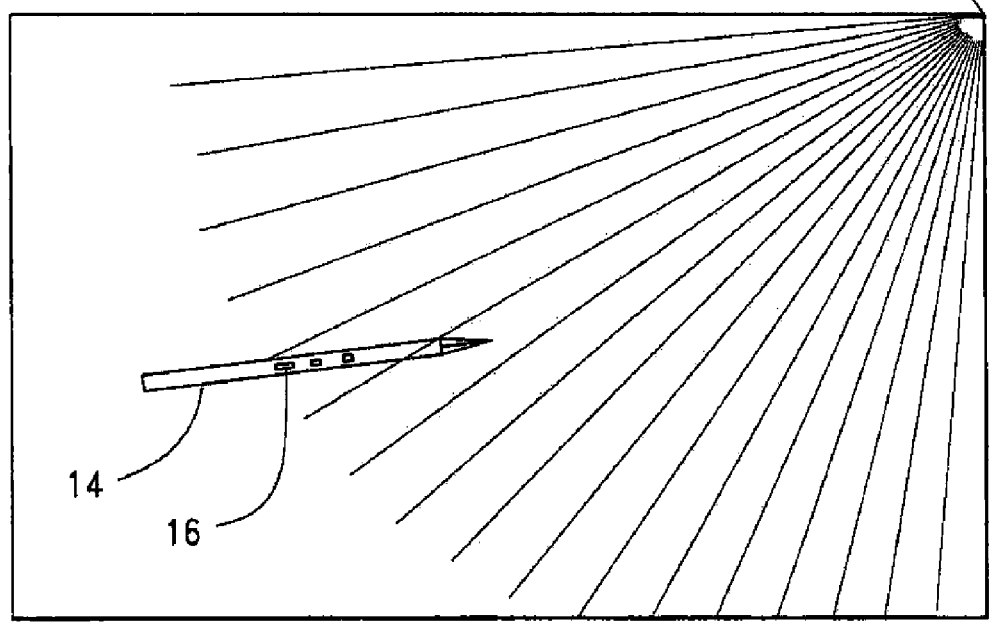
FIG. 4 is a graphical illustration of the magnetic field source relative to the detection devices.

FIG. 4 depicts the invention after it has resolved the position of the beacon 16 (inside the drill head 14) relative to the location of a detection device 18. The technique disclosed involves subdividing the range of possible direction angles θ. Algorithms may be developed which subdivide the range of all possible radial distances, r. Accordingly, the disclosure and techniques under discussion should not be interpreted as being limited in any way to use of only direction angles, θ, or only radial distances, r. One example algorithm may exploit the maximum and minimum values of both radial distance r and the corresponding average direction angle θ to define pixel-like volumes of permissible bit locations. Although not the immediate subject of these disclosures, alternative algorithms are clearly possible.

Figure 5:
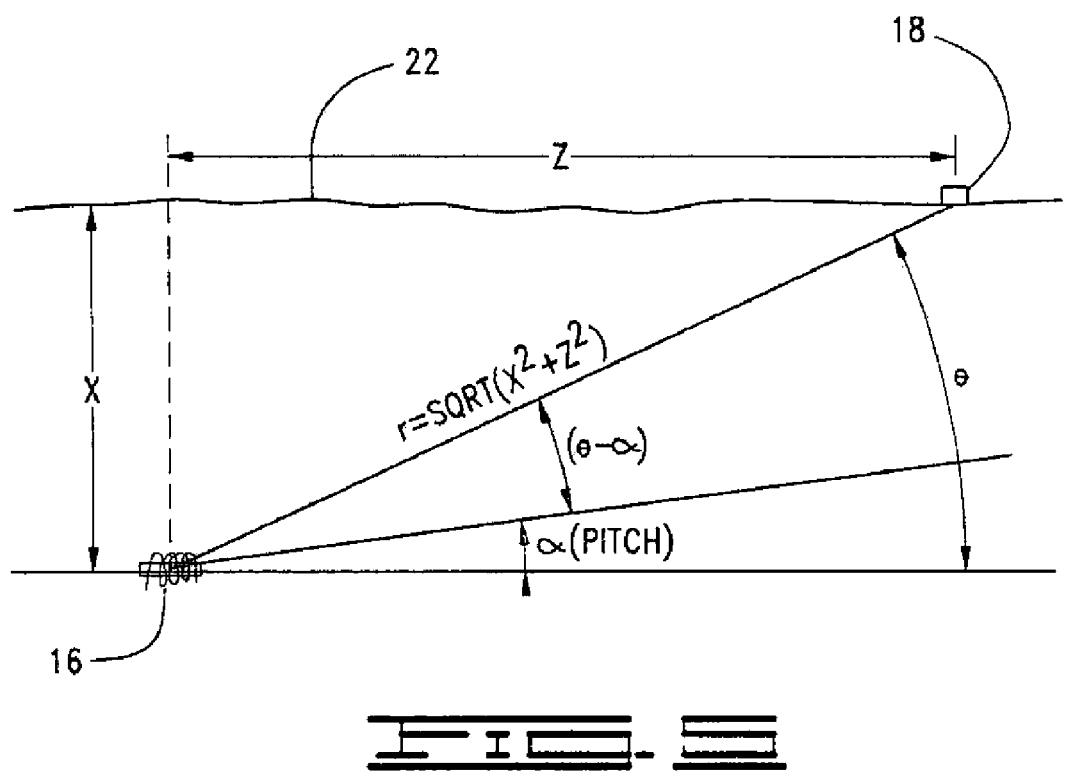
FIG. 5 is a pictorial representation of the determination of the location of the source in accordance with the present invention.

These relationships are important in their own right, but are also the basis of calculations to generate synthetic data for algorithm development or for algorithms which iteratively search for acceptable solutions. Algorithm development carries the requirement of predicting magnetic field amplitude (hence, the magnetic field ratio $H_{ratio}$) at any location and at any pitch. As shown in FIG. 5, this is accomplished by modifying the z-x coordinates according to the transmitting antenna's 16 pitch angle.

Figure 6:
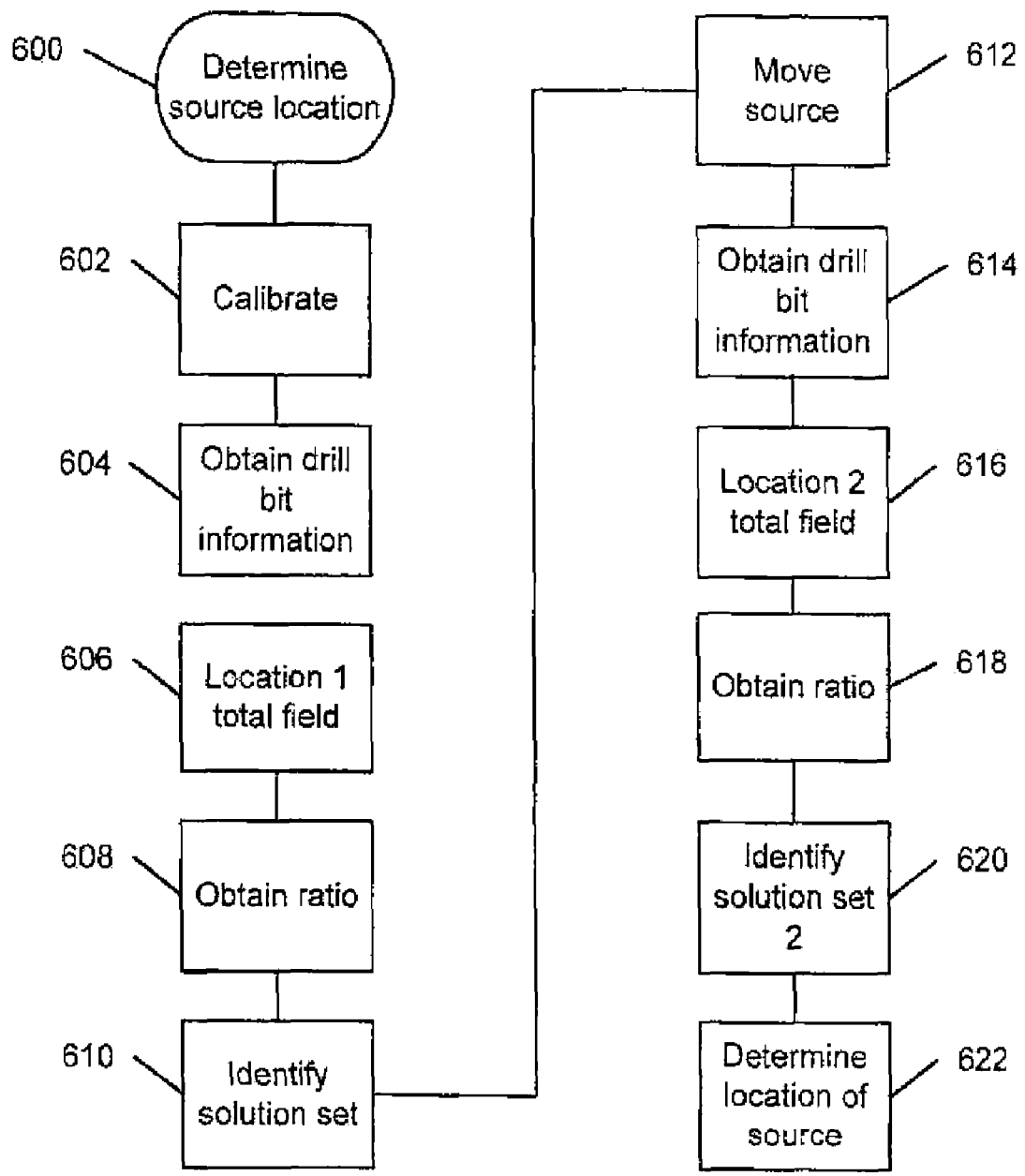
FIG. 6 is a flowchart illustrative of a process for determining the location of a source in accordance with the present invention.

Given the previously discussed relationships, the present invention provides a method for determining the location of the below ground source 16 relative to the detection device 18. Referring now to FIG. 6, there is provided a flowchart for a process for determining the location of the source 16. Initially, the detection device 18 is calibrated to the source 16 and a calibration measurement obtained at 602. Next, during the boring operation and with the source 16 underground at an unknown first location, the pitch ($P_1$) and other information concerning the operation of the drill bit 17 is obtained from sensors in the drill head 14 at 604. At 606, a first measurement of the magnetic field from the source 16 by the detection device 18 is taken. Using previously discussed relationships, the ratio of the first magnetic field measurement to the calibration measurement ($H_{ratio1}$) is established at 608. The first set of solution angles and distances to the source 16 is calculated at 610. The source 16 is then advanced a known distance to an unknown second location at 612. Drill bit 17 information, such as the pitch ($P_2$) of the source 16, is obtained as necessary at 614. At 616 a second measurement of the magnetic field from the source 16 is taken at the second location. The second ratio ($H_{ratio2}$), of the second magnetic field measurement to the calibration measurement, is then determined at 618. The second set of solution angles and distances to the source 16 is calculated at 620. At 622, the relative location of the source 16 to the detection device 18 is then determined using the first and second sets of possible angles to the source, the known distance the source had been moved, and the pitch of the source at the second location.

The relative location is preferably a surface distance from the detection device 18 to the source 16 and a depth of the source below the surface 22. Where survey data of an area containing the bore path is available, the survey data can be used to provide the location of the source 16 relative to points in addition to that of the detection device 18. For example, the relative location of the source may also be provided for the HDD machine 10 (or other position specified as required) where survey data is available. Additionally, where data is available to indicate the left-right offset of the source 16 from a desired bore path, the relative location information would also include a distance of the source from a center line axis of the detection device 18.

The present invention comprises a derivation from basic problem physics with the particular desire to determine beacon 16 location from a very sparse underspecified data set. Certain findings, most notably the closed-form solutions for direction angle θ and radial distance r, indicate that only a relatively restricted range of permissible radial distances can satisfy a single ratiometric measurement involving the total magnetic field at a point and the total magnetic field at calibration. Consequently, a functioning algorithm involving two ratiometric measurements, with knowledge of drilling trajectory, pitch, and the incremental drill string 13 length added between measurements, is adequate to determine beacon 16 location.

Similarly, the present invention permits the generation of synthetic data which already has been of demonstrated utility in modeling studies supporting the overall design objective.

The invention provides an HDD system using one or more relatively simple receivers 18 to define a borepath 20 and then to determine the boring tool's 14 location with respect to the simple receiver devices. No tracking receiver 18 operator is required, making possible the long-sought goal of establishing an HDD system for single-operator use. Other difficult HDD problems, such as river crossings, road crossings, bore to the box drilling, and similar problem assignments, are greatly simplified. The simple receiver devices 18 need not be positioned on the surface 22—they could be located in a pit, suspended from suitable supports, or submerged if enclosed in a suitable water-tight housing.

Those skilled in the art will appreciate that the simple receiver devices 18 described in these specifications must communicate the measurements and other data to a remote system, such as the control system 26 of the HDD machine 10, as previously discussed. There are a variety of data communication options known in the art. While RF link data transmission is the preferred embodiment, other techniques (e.g., wireline, electrical cable, fiber optic cable, IR transmission) are clearly within the scope of this invention.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

The invention claimed is:

1. A method for determining the location of a below ground source of a magnetic field, the method comprising:
    obtaining a calibration measurement of a magnetic field from the source;
    detecting a first measurement of the magnetic field from the source when the source is at a first location below ground;
    calculating a ratio of the first magnetic field measurement to the calibration measurement;
    identifying a set of solution angles and distances to the source;
    advancing the source a known distance to a second location;
    detecting a second measurement of the magnetic field from the source when the source is at the second location;

determining a pitch of the source using a measurement device;

calculating a ratio of the second magnetic field measurement to the calibration measurement;

identifying a second set of solution angles and distances to the source; and determining a location of the source using the first set and second set, the known distance, and the pitch.

2. The method of claim 1 wherein the steps of detecting a first measurement and detecting a second measurement comprise using a detection device, the detection device comprising a three-axis antenna assembly to sense the magnetic field.

3. The method of claim 2 wherein the antenna assembly comprises an antenna triad adapted to produce a total magnetic field measurement acting at a common center point.

4. The method of claim 3 further comprising the step of displaying a relative location of the source, the relative location comprising a distance and a depth along a bore path.

5. The method of claim 3 further comprising the step of displaying a location of the source relative to the detection device.

6. The method of claim 1 further comprising the steps of:
measuring a left-right offset; and
wherein the relative location further comprises the left-right offset.

7. The method of claim 6 wherein measuring a left-right offset comprises obtaining signals from the detection device and determining a distance from a center line axis of the source.

8. The method of claim 2 wherein the step of obtaining a calibration measurement comprises detecting a total magnetic field from the source when the source is in a predetermined orientation and is a predetermined distance from the detection device.

9. The method of claim 8 wherein the predetermined orientation comprises placing an axis of the detection device parallel to an axis of the source and the predetermined distance is ten feet.

10. The method of claim 1 wherein the measurement device comprises an accelerometer.

11. The method of claim 1 wherein the step of determining a location of the source comprises identifying a point of symmetry between the first set and the second set.

12. The method of claim 11 wherein the point of symmetry identifies a horizontal separation and a depth of the beacon.

13. The method of claim 11 wherein the step of identifying a first set and a second set comprises using a mathematical model representing a symmetry of the magnetic field from the source.

14. A method for determining a location of a below ground source of a magnetic field, the method comprising the steps of:

determining a ratio between a total magnetic field measured at a location of the source below ground and a total magnetic field measured during calibration;

advancing the source a known distance to a second location;

determining a ratio between a total magnetic field measured at the second location and the total magnetic field measured during calibration;

measuring a pitch of the source; and determining a position of the source relative to a position on the surface of the ground using the determined ratios, the known distance, and the measured pitch.

15. A method for tracking progress of a horizontal bore, the system comprising:

deploying a plurality of detection devices each adapted to detect a magnetic field from a source, the detection devices spaced along the ground;

moving the source to a location along an underground path;

detecting the magnetic field from the source using a first one of the detection devices;

moving the source to a second location along the underground path;

detecting the magnetic field from the source at the second location using the first one of the detection devices and a second one of the detection devices;

determining a relative location of the source to each detection device using a corresponding magnetic field ratio, a distance the source traveled, and a pitch of the source;

moving the source to a third location along the underground path;

detecting the magnetic field from the source at the third location using the second one of the detection devices; and determining a second relative location of the source to each detection device using a corresponding magnetic field ratio, a distance the source traveled, and a pitch of the source.

16. The method of claim 15 wherein at least one of the plurality of detection devices is placed below the surface of the ground.

17. The method of claim 16 wherein the at least one detection device is a known distance below the surface of the ground.

18. The method of claim 15 further comprising the step of obtaining survey data relating to a physical location of the plurality of detection devices.

* * * * *